No. 785,904. PATENTED MAR. 28, 1905.
A. MAY.
WAXING UP TOOL FOR DENTAL TRIAL PLATES.
APPLICATION FILED AUG. 15, 1904.
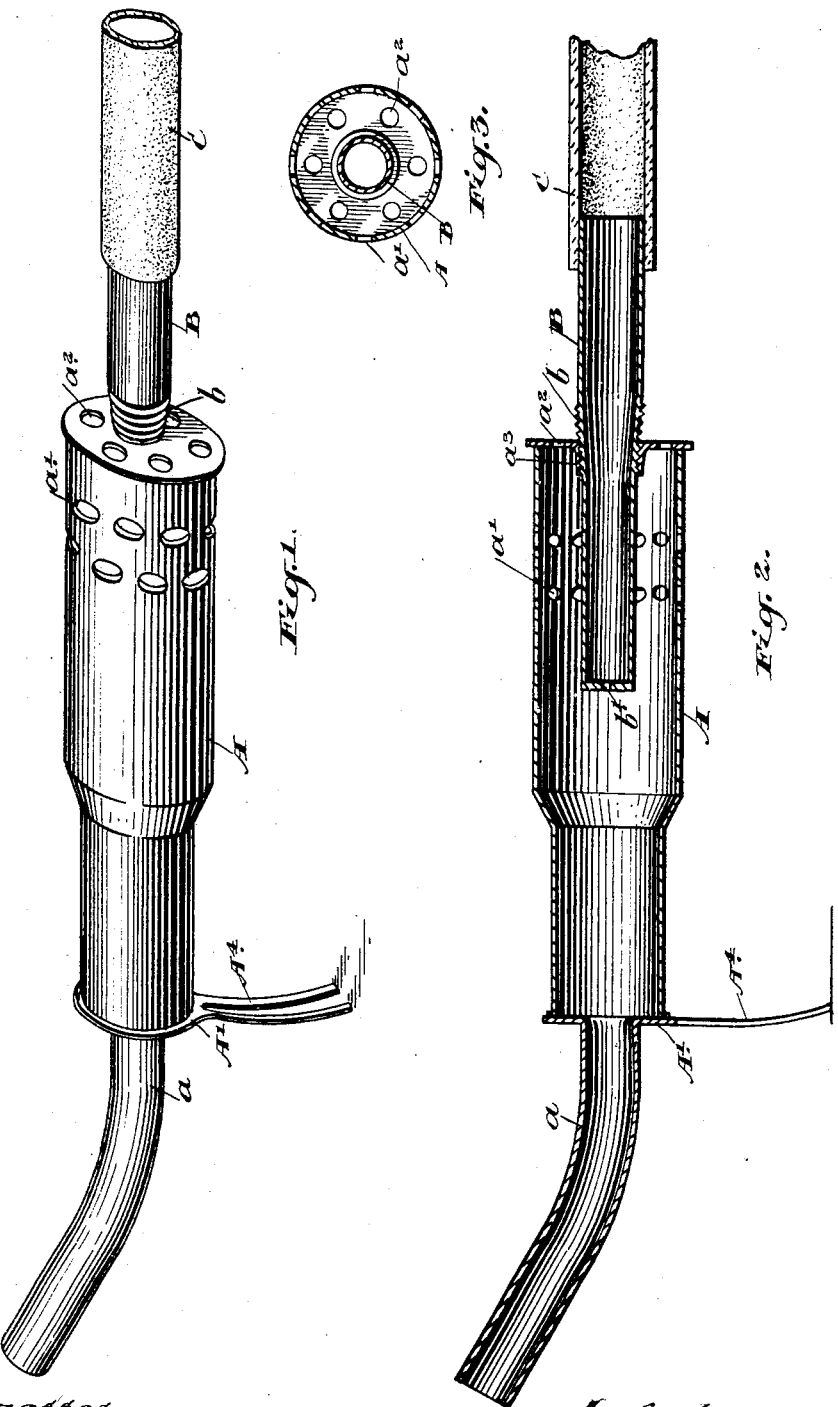

No. 785,904. Patented March 28, 1905.

UNITED STATES PATENT OFFICE.

ANDREW MAY, OF ST. CATHERINES, CANADA.

WAXING-UP TOOL FOR DENTAL TRIAL-PLATES.

SPECIFICATION forming part of Letters Patent No. 785,904, dated March 28, 1905.

Application filed August 15, 1904. Serial No. 220,849.

*To all whom it may concern:*

Be it known that I, ANDREW MAY, dentist, of the city of St. Catherines, in the county of Lincoln, in the Province of Ontario, Canada, have invented certain new and useful Improvements in Waxing-Up Tools for Dental Trial-Plates, of which the following is a specification.

My invention relates to improvements in waxing-up tools for dental trial-plates; and the object of the invention is to devise a convenient tool of this class by which the intense heat necessary may be produced economically; and it consists, essentially, of a casing provided with supporting-legs and a tubular extension at one end at the mouth of which the blue flame is designed to be produced and perforations at the opposite end and a nozzle screwed thereinto and provided with an end orifice, the nozzle being connected at the outer end to the ordinary rubber tube leading to the gas-jet from which the supply of gas is obtained, the parts being otherwise arranged and constructed in detail as hereinafter more particularly explained.

Figure 1 is a perspective view of my improved waxing-up tool. Fig. 2 is a longitudinal section through the tool. Fig. 3 is a cross-section showing the arrangement of the perforations.

In the drawings like letters of reference indicate corresponding parts in each figure.

A is the main casing of the tool, at one end of which is secured a tubular extension $a$, and the opposite end of which is enlarged and provided with peripheral preforations $a'$ and end perforations $a^2$ in the head. The head is provided with an inwardly-extending internally-threaded boss $a^3$, as indicated.

$A^4$ represents supporting-legs for the tool, which are attached to or form part of the end $A'$, from which the bent tubular extension $a$ projects.

B is a nozzle provided with an exterior thread $b$ intermediate of its length, by which it is securely held in the threaded boss $a^3$ in the head of the casing A. The nozzle B is provided with an end opening $b'$.

C is the tube, which is suitably secured on the outer end of the nozzle B, such tube leading to the gas-jet from which the supply of gas is obtained for the tool.

It will be noticed that the casing A is reduced at its discharge end, as is also the nozzle B. The gas passes through the aperture $b'$ in the nozzle B, and the air mixes therewith and passes outwardly through the tube $b$, at the mouth of which when lighted a blue flame of intense heat is produced.

Such a tool as I describe is convenient and I have found efficient for the purpose designed.

What I claim as my invention is—

1. In a waxing-up tool for dental trial-plates, the combination with the casing having a reduced tubular extension at one end curved upwardly and the perforations at the opposite end and in the periphery of the casing near such end, of a nozzle fitting into the interior of the casing and provided with an internal orifice at the inner end as specified.

2. In a waxing-up tool for dental trial-plates, the combination with the casing having a reduced tubular extension at one end curved upwardly and the perforations at the opposite end and in the periphery of the casing near such end, of a nozzle fitting into the interior of the casing and provided with an internal orifice at the inner end and the legs secured to the head of the casing extending laterally therefrom and curved downwardly and rearwardly as specified.

ANDREW MAY.

Witnesses:
  M. McLAREN,
  A. NEWLANDS.